Jan. 21, 1964  C. ALIMANESTIANO  3,118,187
PORTABLE LAYOVER UNIT
Filed July 5, 1962  5 Sheets-Sheet 1

INVENTOR.
Constantin Alimanestiano
BY
Olson, Trexler, Wolters & Bushnell
Attys.

Jan. 21, 1964 C. ALIMANESTIANO 3,118,187
PORTABLE LAYOVER UNIT
Filed July 5, 1962 5 Sheets-Sheet 2

INVENTOR.
Constantin
Alimanestiano
By: Olson, Trexler
Wolters & Bushnell Attys.

Jan. 21, 1964 C. ALIMANESTIANO 3,118,187
PORTABLE LAYOVER UNIT
Filed July 5, 1962 5 Sheets-Sheet 3

Fig. 5.

INVENTOR.
Constantin
Alimanestiano
By: Olson, Trexler
Wolters & Bushnell attys

Jan. 21, 1964 C. ALIMANESTIANO 3,118,187
PORTABLE LAYOVER UNIT
Filed July 5, 1962 5 Sheets-Sheet 5

INVENTOR.
Constantin
BY Alimanestiano

Olson, Trexler
Wolter & Bushnell Attys

United States Patent Office 3,118,187
Patented Jan. 21, 1964

3,118,187
PORTABLE LAYOVER UNIT
Constantin Alimanestiano, Chicago, Ill., assignor to Smalltel, Inc., Chicago, Ill., a corporation of Illinois
Filed July 5, 1962, Ser. No. 207,722
7 Claims. (Cl. 20—2)

The present invention is concerned with the weary traveler who may be in need of a bath, privacy, toilet facilities, relaxation, rest, and even sleep, yet who does not have the time or the economic justification to seek out and rent a room in a conventional hotel, inn, motel, or the like. Conventional lodging facilities have not and cannot serve the needs of such travelers. Unfilled needs, of the character indicated, have contributed to the fatigue and inconvenience which travelers have had to accept as a practical matter.

The present application is a continuation-in-part of application Serial No. 8,607, filed February 15, 1960, and now abandoned.

One object of the invention is to provide for human occupancy a non-vehicular yet readily transportable layover unit well adapted to be hoisted onto a flatbed highway trailer and transported on a flatbed highway trailer without special permission, and equally well adapted to be hoisted off the trailer and maneuvered through restricted openings and passages in buildings and the like into areas in passenger terminals, for example, where the unit is most conveniently accessible to patrons, the unit being so constructed and equipped that approximately eight people can be accommodated in the unit at once, each person being provided with a complete private bath, including a shower and a full-size wash basin and flush toilet, a full size bed, and a private living area adequate for a layover period of indeterminate length, all without being subject to the feeling of being cramped within the necessarily limited space made available for an individual patron of the unit.

Another object is to provide a non-vehicular yet readily transportable layover unit designed to occupy a highly restricted volume of space so that the unit can be moved into and accommodated within a restricted passenger terminal space, for example, and having a new and improved construction and arrangement of equipment which affords to a sizable number of individual patrons private layover accommodations within the unit in a manner which effectively utilizes the full limited space allocated to each patron to provide to the patron the visible basis for a feeling of having living space adequate for a layover period of indefinite length, while at the same time providing to the individual patron full size sleeping facilities and an effectively concealed yet complete bath, including a shower and a full size wash basin and a full size flush toilet.

Another object is to provide for human occupancy a non-vehicular layover unit which is constructed and limited in size to be readily transportable by highway trailers for installation on stationary support structure in areas where space may be at a premium, the unit having a construction and arrangement of facilities which provide to a plurality of patrons private layover accommodations within individual compartments within the unit which are at once highly minimized in size and capable of affording to the individual patron private living space in which the patron has the visual basis for an adequacy of space which obviates for the patron the feeling of being cramped, while at the same time providing to the patron full size sleeping facilities, accommodations for a full size reclining chair, and an effectively concealed complete bath having full size bath and toilet facilities.

A further and more specifically stated object is to provide a multiple compartment, portable layover unit of the character recited in which multiple and seemingly incompatible uses are made of the same space within each compartment to afford to the patron the utmost convenience in complete layover facilities, while at the same time continuously and effectively utilizing the whole space within the unit to provide to the patron the visible basis for a feeling of roominess within the compartment.

A further object is to provide a portable layover unit as recited in the preceding objects in which private compartments for individual patrons are rectangular in shape, each compartment having a width which is substantially less than the length of the compartment, and extends transversely across the unit which is rectangular in form and dimensioned to be transported on a flat bed highway trailer without special permission.

Another object is to provide transportable layover units as recited in the preceding objects which are adapted to be stacked one on top of another in use to make most effective use of the area available for accommodating the units.

Another object is to provide a transportable layover unit of the character recited which is so constructed and arranged that full size fixtures are used in the unit to at once minimize the comfort and convenience of the patrons and minimize the cost of the unit.

Other objects and advantages will become apparent from the following description of the exemplary embodiments of the invention illustrated in the drawings, in which.

Referring to the drawings in greater detail, the illustrated layover unit 20 constructed in accordance with the invention comprises a rectilinear housing 22 shaped and dimensioned to be readily transportable on a flatbed highway trailer 24, while at the same time serving to provide maximum space within the housing.

Figures 1, 2:
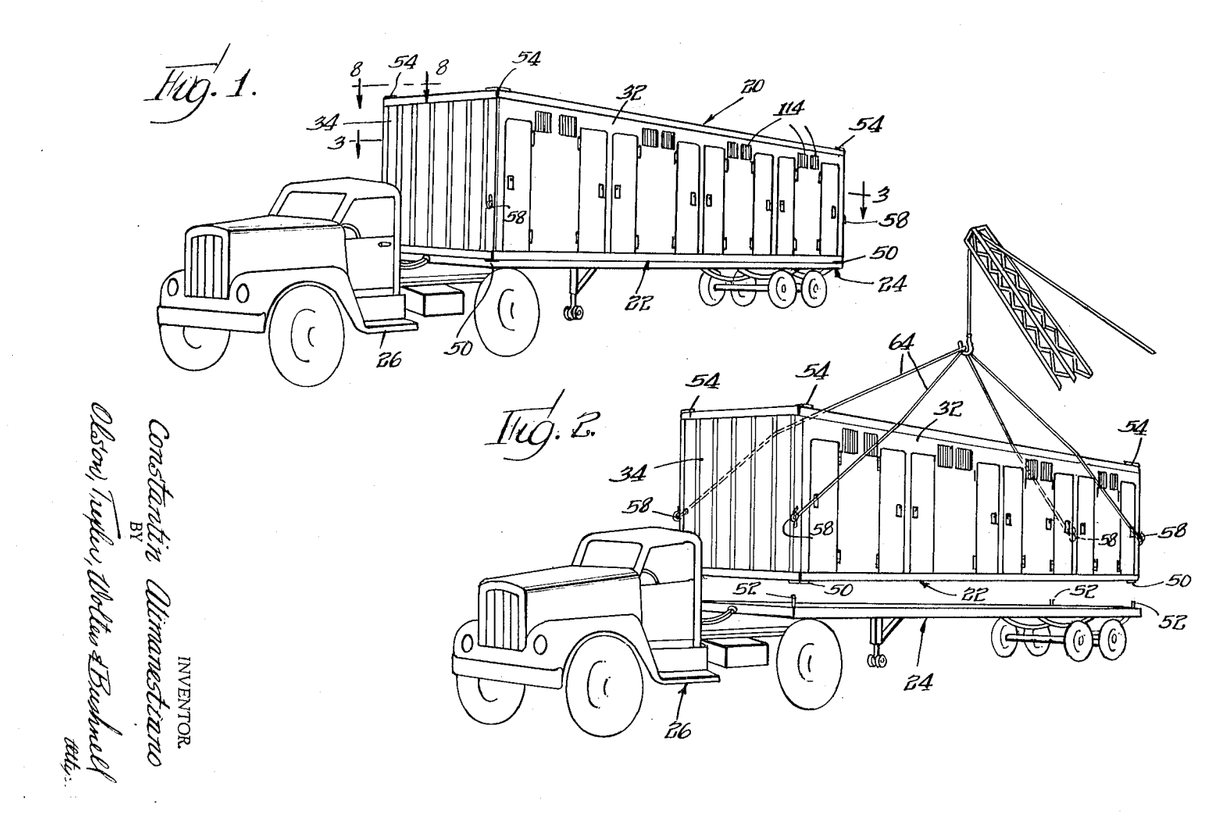
FIGURE 1 is a perspective view showing a layover unit constructed in accordance with the invention supported on a highway trailer for transport.
FIG. 2 is a perspective view illustrating the hoisting of the layover unit from a highway trailer.

The flatbed highway trailer 24 illustrated in FIGS. 1 and 2 is typical of flatbed highway trailers in commercial use. It is pulled on the highway by a tractor 26 and has dimensions which are designed to comply with the legal dimensional limits applicable to highway trailer vehicles which are allowed to travel the highways without special permission.

Thus, the typical flat bed trailer 24 has a length of forty feet and a width of eight feet. The rectilinear housing 22 of the layout unit 20 designed to be transported without special permission on a flatbed highway trailer has a length of forty feet and a width of eight feet corresponding to the length and width dimensions of the typical flatbed triler 24. The typical flatbed trailer 24 itself has a height of four feet. The housing 22 of the layover unit 20 has a height of eight feet, so that the layover unit when hoisted onto a highway trailer for transport extends to a height of twelve feet above the ground, a height which corresponds to the maximum height of trailers and cargoes which can travel freely on the highways without special permission and care.

The layover unit 20 is designed to be manufactured and assembled in complete form in a factory so that relatively little effort and cost are involved in installing the layover unit at the site where it is to be used. Moreover, the unit 20 is by virtue of its construction made capable of accommodating eight patrons at once in individual privacy, providing each patron with complete layover facilities with the utmost convenience even though the over-all dimensions of the unit are limited to make the unit readily transportable by highway trailers without special permission, as indicated.

Figure 4:
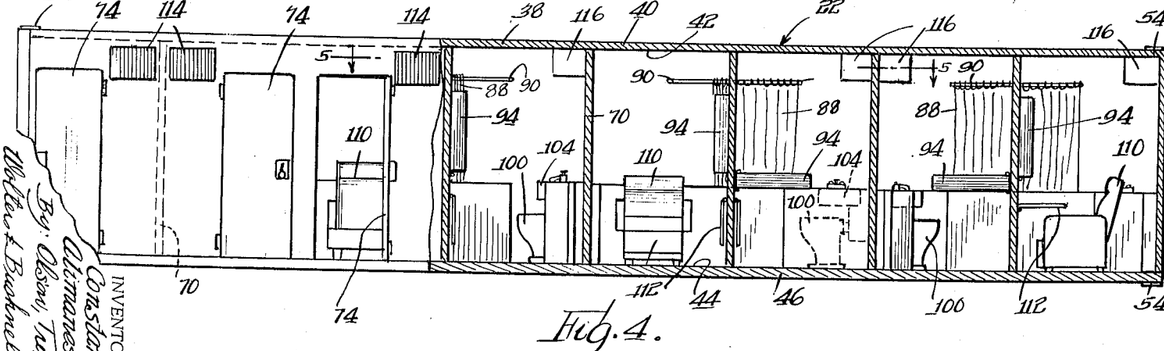
FIG. 4 is a partially sectioned front elevational view of the layover unit.

The layover unit housing 22 itself is rectangular in form over-all and has two longitudinal side walls 30, 32 substantially forty feet long and two transverse end walls 34, 36 substantially eight feet wide. The housing has a substantially flat cover structure 38, approximately three inches thick, FIG. 4, defining a substantially flat roof 40 and a substantially flat ceiling 42 within the housing. A substantially flat floor 44 within the housing is defined by floor and base structure 46 extending below the surface of the floor 44 for a distance limited to six inches or less. The floor and base structure 46 is designed to rest on underlying solid structure separate from the layover unit to support the layover unit. Hence, even though the housing 22 has a height of only eight feet, it defines an internal space having a height between the floor 44 and cealing 42 which is substantially greater than seven feet. As will presently appear, the provision of internal space over seven feet high within a layover unit housing limited in height to eight feet is of great practical advantage in making layover accommodations available in many situations where space and economic limitations rule out the use of conventional lodging facilities.

In general, the side wall, end wall, roof and ceiling, and floor and base structure of the housing 22 is similar to that used in the construction of conventional cargo containers of similar size designed to be transported by flatbed highway trailers. Hence, it is not necessary to specifically illustrate and describe the detailed structure of these components of the housing 22 which are for the most part illustrated only in gross form in drawings such, for example, as FIGS. 3 and 4.

Figures 8, 9, 10:
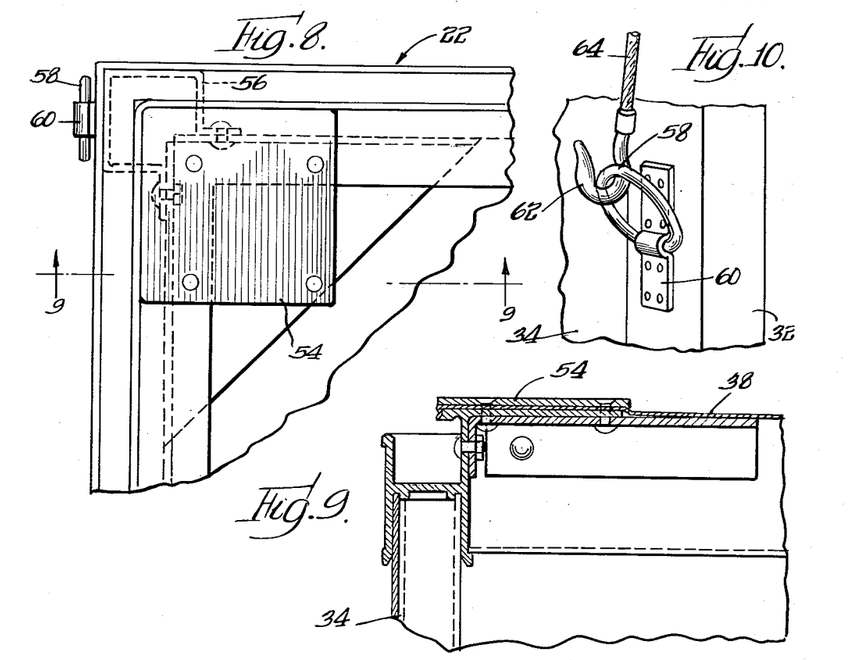
FIG. 8 is a fragmentary plan view on an enlarged scale of one corner of the layover unit taken with reference to the line 8—8 of FIG. 1.
FIG. 9 is a fragmentary sectional view taken with reference to the line 9—9 or FIG. 8.
FIG. 10 is a fragmentary end view of the unit showing a hoist line hooked to a hoisting ring on the unit.
Figure 11:
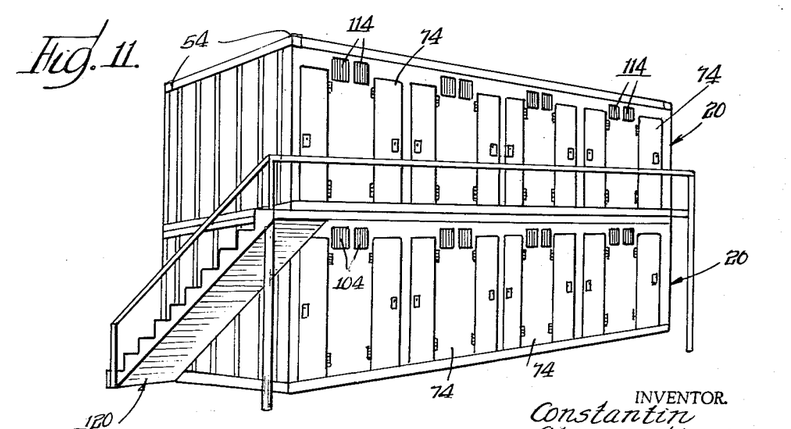
FIG. 11 is a perspective view illustrating two layover units stacked together for use.

However, it should be noted, with reference to FIGS. 1, 2, 8 and 9, that the housing 22 is designed to permit stacking of two layover units 20 one on another for use as illustrated in FIG. 11. Four lower support plates 50 are provided on the underside of the housing 22 at the four corners of the housing to rest on underlying support structure for the layover unit. As indicated in FIG. 2, the lower support elements or plates 50 are designed to coact with lugs 52 on the flat bed trailer 24 which prevent the housing from shifting horizontally in transit. Four upper support elements or plates 54 similar to the lower support plates 50 are mounted on top of the housing 22 at the four corners of the housing, as illustrated in FIGS. 2, 8 and 9, to provide support to a similar layover unit which may be stacked on a lower unit, as shown in FIG. 11. Vertical load bearing column structure 56, FIG. 8, positioned in each corner of the housing 22, is designed to provide vertical support to the upper support plates 54 from the lower plates 50.

Convenient hoisting of the layover unit 20 onto and off of a highway trailer is facilitated by four hoist rings 58, FIGS. 1, 2 and 10, attached by straps 60 to the four corners of the housing 22 at opposite ends of the housing approximately three feet above the lower plates 50, for convenient engagement by hooks 62 of hoist lines 64.

The limited size of the layover unit 20 not only makes for ready transportability of the unit by highway trailers, but is of crucial importance in enabling the unit to be maneuvered through building passages of limited size to permit placement of the unit in areas of passenger terminals, and the like, where the unit must be physically located in order to serve the function of the unit in providing layover accommodations to patrons who cannot seek out conventional lodging facilities.

The fact that the layover unit, even though readily transportable, is non-vehicular makes for a minimized over-all size of the unit, together with a maximized internal space within the unit, both of which are essential to accomplishment of the end achieved by the unit.

Figure 3:
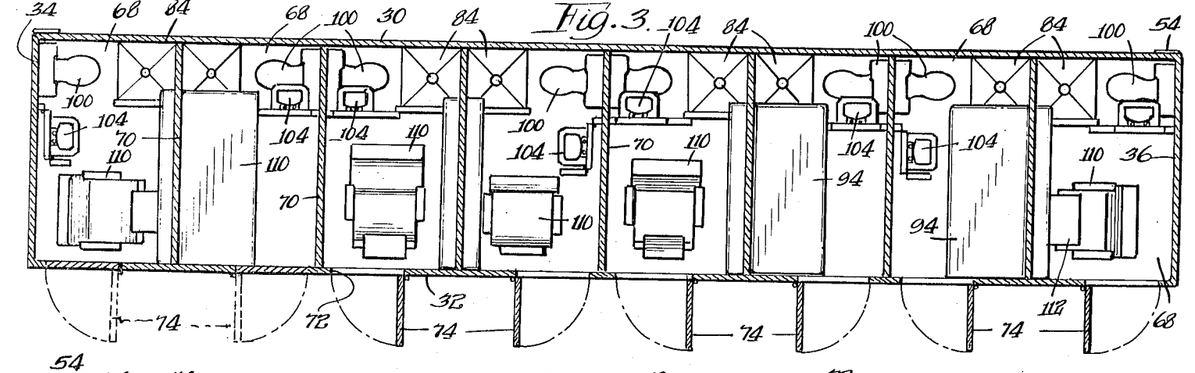
FIG. 3 is a horizontal sectional view of the unit taken with reference to the line 3—3 of FIG. 1.

The space within the eight foot by forty foot housing 22 is divided into eight private compartments 68 of rectangular form, FIG. 3, each of which extends transversely across the housing. This division of the housing into compartments is effected by seven transverse interior walls 70, each having a thickness of approximately three and one-half inches and being formed of a sound absorbing construction. Hence, each compartment 68 has a width of approximately four feet, nine inches and a length of approximately seven feet, six inches, and a height of seven feet and a few inches.

Within the limited rectangular space of each compartment 68, each patron is provided with complete layover facilities in comfort, while being afforded the visual basis for a feeling of having an adequacy of living space.

As illustrated in FIGS. 1 and 3, the longitudinal housing wall 32 defines a plurality of door openings 72 which open into the respective compartments 68 and are closed by doors 74.

Figure 5:
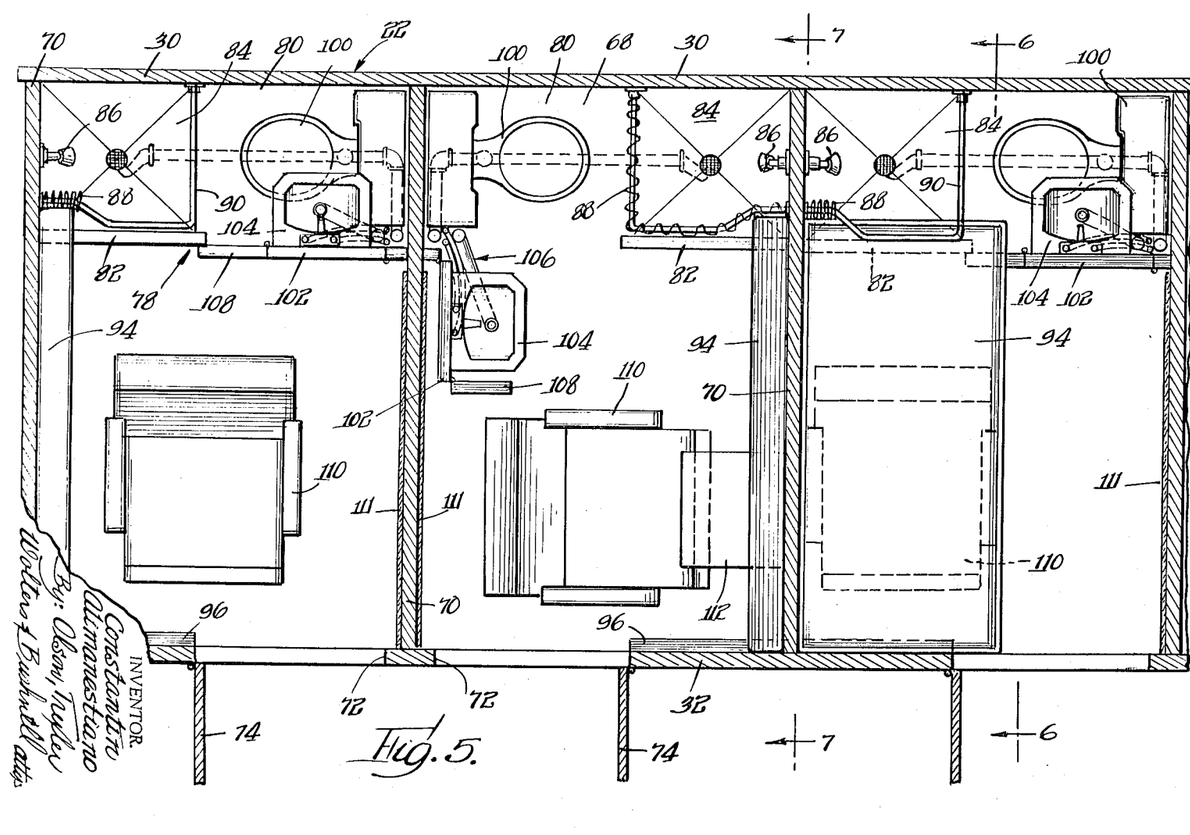
FIG. 5 is a fragmentary horizontal sectional view on an enlarged scale taken with reference to the line 5—5 of FIG. 4.

Having reference to FIG. 5, each rectangular compartment 68 has two longitudinal walls 70 formed by the adjacent transverse walls of the housing 22. Similarly, each compartment has two end walls formed by adjacent portions of the longitudinal housing walls and designated in FIG. 5 by the numbers 30, 32 which identify the longitudinal housing walls. For convenience, the compartment end wall 32 through which the compartment door 74 opens will be referred to as the "front" end wall, and the opposite end wall 30 will be referred to as the "back" end wall. It will be noted that the door opening 72 in the front end wall of each compartment is offset toward one longitudinal compartment wall 70 which for convenience will be referred to as the "door side" wall. Similarly, for convenience, the longitudinal compartment wall 70 opposite from the door side wall will be referred to as the "bed side" wall.

Each patron of the layover unit 20 is provided with a complete bath having full size bath fixtures. Moreover, each compartment 68 in the unit 20 is constructed and arranged so that the bath facilities within the compartment are largely isolated from the view of a person entering the compartment while the whole space within the compartment is effectively utilized to provide the patron with the basis for feeling that the compartment has adequate space for layover purposes without subjecting the patron to the feeling of being cramped.

Figure 6:
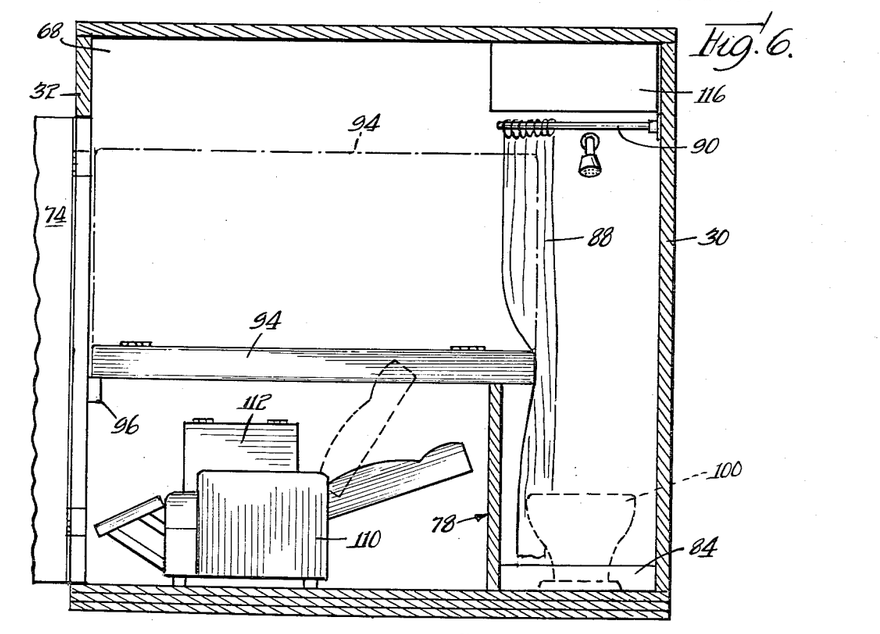
FIG. 6 is a transverse sectional view taken generally along the line 6—6 of FIG. 5.
Figure 7:
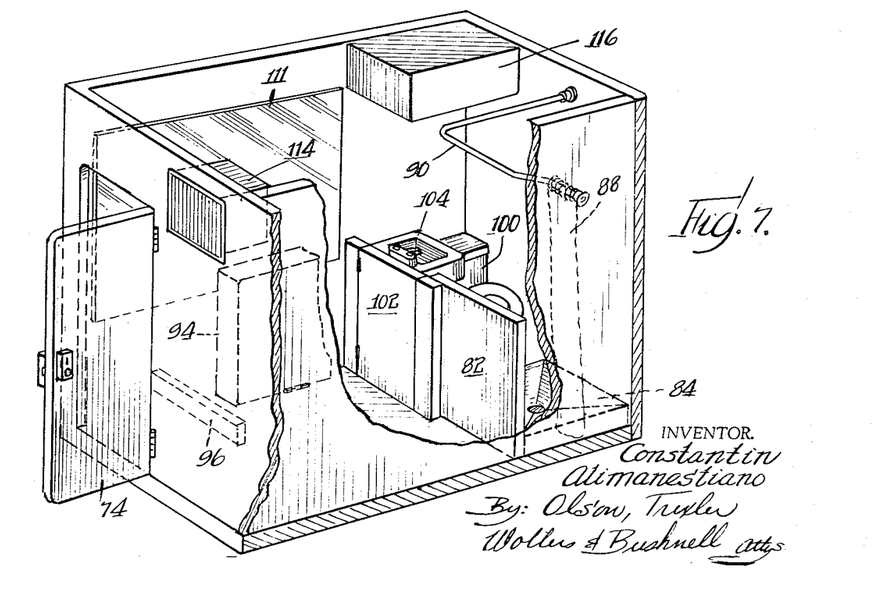
FIG. 7 is a somewhat simplified perspective view taken with reference to the line 7—7 of FIG. 5.

As illustrated in FIGS. 5, 6 and 7, each compartment 68 is provided with a low wall 78 extending transversely across the compartment between the two longitudinal compartment walls 70 at a location spaced approximately two feet from the back wall 30 of the compartment. The low transverse wall 78 has a height of three feet and serves to effectively mask a bathroom area 80 between the wall 78 and the back wall 30. However, since the low wall 78 is below eye level it allows the incoming patron to see all the way to the back wall 30, so that the full length of the compartment is effectively utilized to provide the visual basis for a feeling of spaciousness.

A section 82 of the low wall 78 is stationary and extends outwardly from the "bed side" longitudinal wall 70 into the vicinity of the longitudinal center line of the compartment. This stationary wall section bounds and extends upwardly from shower water collecting means 84 approximately two feet square which is fitted in the adjacent corner of the compartment between the low wall section 82 and the rear wall 30, as shown. A shower head 86 directs water downwardly onto the water collecting means 84. A shower curtain 88 depending from a curtain rod 90, shaped as illustrated in FIG. 5, extends upwardly from the water collecting means 84, as illustrated in FIG. 6.

Even though the shower water collecting means 84 is only two feet square, and even though it is bounded on one side by the low wall section 82, the user of the shower has an effective usable floor area greater than two feet square. The flexibility of the shower curtain 88 allows portions of the body of the user to protrude outwardly over the low wall section 82, so that the user of the shower is not confined to an area two feet square and does in effect have an uncramped shower area, while at the same time having the protection which the low wall 82 affords against falling. When a patron enters a compartment, the shower curtain 88 is collected in an out-of-the-way position on its support rod 90, so that the shower space contributes to the vision of roominess.

The stationary low wall section 82 provides support to a full size bed 94 when the bed is swung downwardly to a horizontal sleeping position. The bed 94 is pivotally supported on the "bed side" longitudinal compartment wall to swing downwardly from a vertical storage position to a horizontal sleeping position. The bed is substantially longer than the space between the low wall section 82 and the front wall of the compartment, so that when the bed is swung down to rest on the low wall section 82 it projects a very extensive distance over the shower water collecting means, as illustrated in FIGS. 5 and 6. A horizontal abutment 96 secured to the front wall 32 of the compartment supports the end of the bed 94 opposite from the bath area 80.

A full size flush toilet 100 is mounted in the bath area 80 of each compartment in the corner of the compartment opposite from the shower water collecting means 84.

To provide access to the bathroom area 80, a section 102 of the low wall 78 is hingedly mounted to form a low door (also denoted by the number 102) which is swingable from a closed position overlapping the stationary low wall section 82, as shown in FIG. 5, to an open position extending outwardly from the bathroom area 84.

A full size wash basin 104 is attached to the bathroom area side of the low door 102 so that upon closure of the door 102 the wash basin 104 moves into overlying relation to the flush toilet 100. Opening of the door 102 makes all of the bathroom facilities fully accessible to the patron, as illustrated in FIG. 5. The wash basin 104 is connected to water supply and sewer connections by flexible conduit indicated generally in FIG. 5 by the number 106.

A free end section 108 of each low door 102 is hinged to the main portion of the low door 102 to swing toward the wash basin 104, as illustrated in FIG. 5, to reduce the extent of the low door out into the living area of the compartment when the door is opened.

A mirror 111 mounted on the "door side" longitudinal wall 70 of each compartment and extending between the front compartment wall 32 and the low wall 78 provides to the patron visible basis for a feeling of increased spaciousness within the compartment.

A full size reclining chair 110 is accommodated within each compartment 68 to provide rest for the patron who does not care to use the bed 94. The chair 110, when turned to its reclining position, FIG. 6, fits conveniently below the bed 94 when the bed is swung down to its sleeping position, as illustrated in FIG. 5. A writing desk 112 pivoted on the "bed side" longitudinal wall of each compartment below the bed 94 can be swung from a generally vertical out-of-the-way position to a general horizontal use position for the patron who may sit in the chair 110 to use the desk.

Each compartment 68 is air-conditioned to the satisfaction of the patron by an air-conditioner 114 mounted within the compartment, as illustrated in FIG. 7.

Electrically energized water heaters 116 provided in the respective compartments 68 above the flush toilets 100 provide hot water for the showers and wash basins in the compartments, thus avoiding the need for providing separate heater facilities outside of the layover unit.

When one layover unit is stacked on top of another, as shown in FIG. 11, to obtain most intensive use of an available floor or ground area, a simple stairway and balcony structure 120 is provided, as illustrated in FIG. 11, to afford convenient access to the doors 74 of the upper unit.

The invention is claimed as follows:

1. A non-vehicular, transportable layover unit for human occupancy comprising an elongated, generally rectangular housing defining therein a plurality of rectangular compartments disposed in side-by-side relation to each other and individually extending lengthwise transversely across the housing, each compartment having a length of approximately seven and one-half feet and a width of approximately four and three-quarters feet, each compartment being bounded by first and second parallel longitudinal walls and first and second end walls of the compartment, a door opening through the first end wall of each compartment adjacent the first longitudinal wall of the compartment, each compartment including shower means located in the corner of the compartment at the intersection of said second longitudinal wall and said second end wall of the compartment; said shower means for each compartment including a shower head, rectilinear shower water collecting means underlying the shower head, and a shower curtain extending upwardly from the water collecting means; a low wall extending transversely across each compartment, said low wall of each compartment including a stationary section thereof extending from said second longitudinal wall of the compartment out into the vicinity of the longitudinal center line of the compartment and bounding the side of said water collecting means opposite from said second end wall, a bed pivoted on said second longitudinal wall of each compartment to swing from a storage position parallel to said second wall downwardly into a horizontal sleeping position in which the bed rests on top of said stationary low wall section and projects an extensive distance beyond the low wall into overlying relation to said shower water collecting means, abutment means mounted on said first end wall of each compartment for supporting the adjacent end of said bed in the compartment when the bed is in its horizontal sleeping position, a flush toilet mounted in the corner of each compartment at the intersection of said first longitudinal wall and said second end wall of the compartment, a reclining chair disposed within each compartment and being adjustable between a sitting position and a reclining position, said low wall in each compartment having a height which exceeds that of the reclining chair in the compartment when the reclining chair is adjusted to its reclining position so that the reclining chair will fit below the sleeping position of the bed in the compartment, said low wall in each compartment including a movable section, means pivotally supporting said movable wall section to form a low door which is horizontally swingable between a closed position parallel to said stationary section of the low wall and an open position in which the low door is swung toward said first end wall, a wash basin mounted on the side of said low door adjacent said second end wall, a mirror mounted on said first longitudinal wall of each compartment in covering relation to a major portion of the area of said first wall, and a writing desk swingably supported on said second longitudinal wall of each compartment for movement between a generally vertical storage position and a generally horizontal writing position protruding outwardly below the bed.

2. A non-vehicular, transportable layover unit for human occupancy comprising an elongated, generally rectangular housing defining therein a plurality of rectangular compartments disposed in side-by-side relation to each other and individually extending lengthwise transversely across the housing, said housing having a width of approximately eight feet, each compartment being bounded by first and second parallel longitudinal walls and first and second end walls of the compartment, a door opening through the first end wall of each compartment adjacent the first longitudinal wall of the compartment, each compartment including shower means located in the corner of the compartment at the intersection of said second longitudinal wall and said second end wall of the compartment, said shower means including a shower head and shower water collecting means underlying the shower head, a low wall extending transversely across each compartment, said low wall having a stationary section thereof extending out into the room from said second longitudinal wall thereof and bounding one side of said water collecting means, said low wall of each compartment including a stationary section thereof extending from said second longitudinal wall of the compartment out into the vicinity of the longitudinal center line of the compartment and bounding the side of said water collecting means opposite from said second end wall, a bed pivoted on said second longitudinal wall of each compartment to swing from a generally vertical storage position downwardly into a horizontal sleeping position in which the bed rests on top of said stationary low wall section and projects beyond the low wall into overlying relation to said shower water collecting means, said bed and said shower water collecting means having cumulative dimensions along said second wall of the compartment which materially exceed the length of the compartment, a flush toilet mounted in the corner of each compartment at the intersection of said first longitudinal wall and said second end wall of the compartment, said low wall in each compartment including a movable section thereof, means pivotally supporting said movable wall section to form a low door swingable toward said first end wall from a closed position parallel to said stationary section of the low wall, and a wash basin mounted on the side of said low door of said low wall adjacent said second end wall.

3. A non-vehicular, transportable layover unit for human occupancy comprising an elongated, generally rectangular housing defining therein a plurality of rectangular compartments disposed in side-by-side relation to each other and individually extending lengthwise between opposite longitudinal sides of the housing, each compartment being bounded by first and second parallel longitudinal walls and first and second end walls of the compartment, a door opening through the first end wall of each compartment adjacent the first longitudinal wall of the compartment, each compartment including shower means located in the corner of the compartment at the intersection of said second longitudinal wall and said second end wall of the compartment; said shower means for each compartment including a shower head, shower water collecting means underlying the shower head, and a shower curtain extending upwardly from the water collecting means; a low wall extending transversely across each compartment, said low wall including a stationary section thereof extending outwardly from said second longitudinal wall of the compartment and bounding the side of said water collecting means opposite from said second end wall, a bed pivoted on said second longitudinal wall of each compartment to swing from a generally vertical storage position downwardly into a horizontal sleeping position in which the bed rests on top of said stationary low wall section and projects beyond the low wall into overlying relation to said shower water collecting means, said bed and said shower water collecting means having dimensions along said second wall of the compartment which cumulatively exceed the length of the compartment to a very material degree, a flush toilet mounted in the corner of each compartment at the intersection of said first longitudinal wall and said second end wall of the compartment, a chair disposed within each compartment and being constructed and dimensioned to fit below said sleeping position of the bed in the compartment, said low wall including a movable section thereof, means pivotally supporting said movable wall section to form a low door swingable toward said first end wall from a position parallel to said stationary portion of the low wall, a wash basin mounted on the toilet side of said low door in each compartment, and a mirror mounted on said first longitudinal wall of each compartment in covering relation to a major portion of the area of said first wall.

4. A non-vehicular, transportable layover unit for human occupancy, comprising, a rectangular housing having four outside walls including two longitudinal side walls and two transverse end walls, said housing including generally flat cover and ceiling structure, said housing including means defining a generally flat floor and base structure immovable in relation to said walls and extending below said floor for a distance which is limited to a fraction of one foot, said base structure including four lower corner elements located on the underside of the housing at the four corners thereof to support the housing on underlying solid structure, said housing including four upper support elements located on the upper side of the housing at the four corners thereof to provide support to an overlying layover unit of similar construction, said housing including vertical load-bearing members extending between the lower corner elements and the upper corner elements of the housing to provide vertical support to the upper corner elements, a plurality of transverse interior walls supported in the housing to extend individually between said side walls and between the floor and ceiling of the housing to divide the space within the housing into a plurality of rectangular compartments each of which extends lengthwise between said side walls of the housing, one of said side walls of the housing defining a plurality of door openings positioned to open into said respective compartments, swingable doors for closing said respective openings, each of said compartments having first and second longitudinal walls formed by the adjacent transverse walls of the housing and having first and second compartment end walls formed by adjacent portions of the side walls of the housing, said door opening for each compartment being positioned in said first end wall of the compartment adjacent said first longitudinal wall of the compartment, a low wall extending transversely across each compartment and being spaced approximately two feet from the second end wall of the compartment to define between the low wall and the second end wall a bathroom area shielded by the low wall, a flush toilet positioned in said bathroom area of each compartment adjacent said first longitudinal wall thereof, shower means positioned in said bathroom area of each compartment adjacent said second longitudinal wall of the compartment and including shower water collecting means extending between said second end wall and said low wall of the compartment, said low wall including a stationary section thereof extending from said second longitudinal wall of the compartment, a full length bed pivoted on said second longitudinal wall of each compartment for swinging movement from a vertical position downwardly to a generally horizontal sleeping position in which the bed rests on said stationary portion of said low wall and extends over the adjacent shower water collecting means, means on said first end wall of each compartment positioned to support the adjacent end of said bed in the compartment when the bed is in its sleeping position, said water collecting means and said bed of each compartment having dimensions along said second wall of the compartment which cumulatively exceed the length of the compartment by a substantial degree, a section of said low wall being swingably supported to form a door swingable from a closed position parallel to the stationary portion of the low wall to an open position extending toward the compartment door, a wash basin supported on the flush toilet side of said swingable door section of said low wall, an air conditioner in each of said compartments, a water heater in each of said compartments, a shower curtain supported in each of said compartments to extend upwardly from said low wall and to extend between said low wall and said second end wall of the compartment, a mirror mounted on said first longitudinal wall of each compartment in covering relation to a major portion of the area thereof, a chair disposed in each compartment and dimensioned to fit under the sleeping position of the bed in the compartment, and a writing desk swingably supported on one wall of each compartment for movement between an out-of-the-way position and a generally horizontal working position.

5. A non-vehicular, transportable layover unit for human occupancy, comprising, a rectangular housing having four outside walls including two longitudinal side walls and two transverse end walls, said housing including generally flat cover and ceiling structure, said housing including means defining a generally flat floor and base structure immovable in relation to said walls and extending below said floor for a distance which is limited to a fraction of one foot, a plurality of transverse interior walls supported in the housing to extend individually between said side walls and between the floor and ceiling of the housing to divide the space within the housing into a plurality of rectangular compartments each of which extends lengthwise between said side walls of the housing, each of said compartments having first and second longitudinal walls formed by the adjacent transverse walls of the housing and having first and second compartment end walls formed by adjacent portions of the side walls of the housing, a door opening through said first end wall of each compartment adjacent said first longitudinal wall of the compartment, a low wall extending transversely across each compartment and being spaced from the second end wall of the compartment to define between the low wall and the second end wall a bathroom area shielded by the low wall, a flush toilet positioned in said bathroom area of each compartment adjacent said first longitudinal wall thereof, shower means positioned in said bathroom area of each compartment adjacent said second longitudinal wall of the compartment and including shower water collecting means extending between said second end wall and said low wall of the compartment, said low wall including a stationary section thereof extending from said second longitudinal wall of the compartment, a full length bed pivoted on said second longitudinal wall of each compartment for swinging movement from a vertical position downwardly to a generally horizontal sleeping position in which the bed rests on said stationary section of said low wall and extends over the adjacent shower water collecting means, means on said first end wall of each compartment positioned to support the adjacent end of said bed in the compartment when the bed is in its sleeping position, said water collecting means and said bed of each compartment having dimensions along said second wall of the compartment which cumulatively exceed the length of the compartment by a substantial degree, a section of said low wall being swingably supported to form a door swingable from a closed position parallel to the stationary section of the low wall to an open position extending away from said second wall of the compartment, a wash basin supported on the flush toilet side of said swingable door section of said low wall, an air conditioner in each of said compartments, a shower curtain supported in each of said compartments to extend upwardly from said low wall and to extend between said low wall and said second end wall of the compartment, and a mirror mounted on one wall of each compartment in covering relation to a major portion of the area thereof.

6. A non-vehicular, transportable layover unit for human occupancy, comprising, a rectangular housing having four outside walls including two longitudinal side walls and two transverse end walls, said housing including generally flat cover and ceiling structure, said housing including means defining a generally flat floor and base structure immovable in relation to said walls and extending below said floor for a distance which is limited to a small fraction of the overall height of the housing, a plurality of transverse interior walls supported in the housing to extend individually between said side walls and between the floor and ceiling of the housing to divide the space within the housing into a plurality of rectangular compartments each of which extends lengthwise between said side walls of the housing, each of said compartments having two longitudinal walls formed by the adjacent transverse walls of the housing and first and second end walls formed by portions of the side walls of the housing, an entrance door opening through said first end wall of each compartment, a low wall extending transversely across each compartment in spaced relation to said second end wall of the compartment to define a bath and toilet area between said low wall and said second end wall of the compartment, a flush toilet and shower bath means positioned in said bath and toilet area, said low wall including a stationary section thereof extending out into the compartment from one longitudinal wall of the compartment, a full length bed pivoted on said one wall of each compartment for swinging movement from a vertical position downwardly to a generally horizontal sleeping position in which the bed overlies said stationary section of said low wall, a section of said low wall being swingably supported to form an inside door swingable from a closed position parallel to the stationary section of the low wall to an open position extending toward the compartment door, and a wash basin supported on the bath and toilet area side of said inside door.

7. A non-vehicular, transportable layover unit for human occupancy, comprising, a rectangular housing having four outside walls including two longitudinal side walls and two transverse end walls, said housing including generally flat cover and ceiling structure, said housing including means defining a generally flat floor and base structure immovable in relation to said walls and extending below said floor for a distance which is limited to a small fraction of the overall height of the housing, a plurality of transverse interior walls supported in the housing to extend individually between said side walls and between the floor and ceiling of the housing to divide the space within the housing into a plurality of rectangular compartments each of which extends lengthwise between said side walls of the housing, each of said compartments having two longitudinal walls formed by the adjacent transverse walls of the housing and first and second end walls formed by portions of the side walls of the housing, a door opening through said first end wall of each compartment, a low wall extending transversely across each compartment in spaced relation to said second end wall of the compartment to define a bath and toilet area between said low wall and said second end wall of the compartment, bath and toilet fixtures positioned in said bath and toilet area of each compartment, a full length bed supported in each compartment for swinging movement between a generally vertical position and a generally horizontal sleeping position in which the bed overlies said low wall and projects a substantial distance beyond the low wall over said bath and toilet area, and a section of said low wall being swingably supported to form a door which opens away from said bath and toilet area.

References Cited in the file of this patent

UNITED STATES PATENTS

| | | |
|---|---|---|
| 1,362,069 | Witzel | Dec. 14, 1920 |
| 2,481,148 | Patton | Sept. 6, 1949 |
| 2,546,134 | Watter | Mar. 20, 1951 |
| 2,743,683 | Calhoun | May 1, 1956 |